3,754,020
PRODUCTION OF GLYCEROL ACETATES

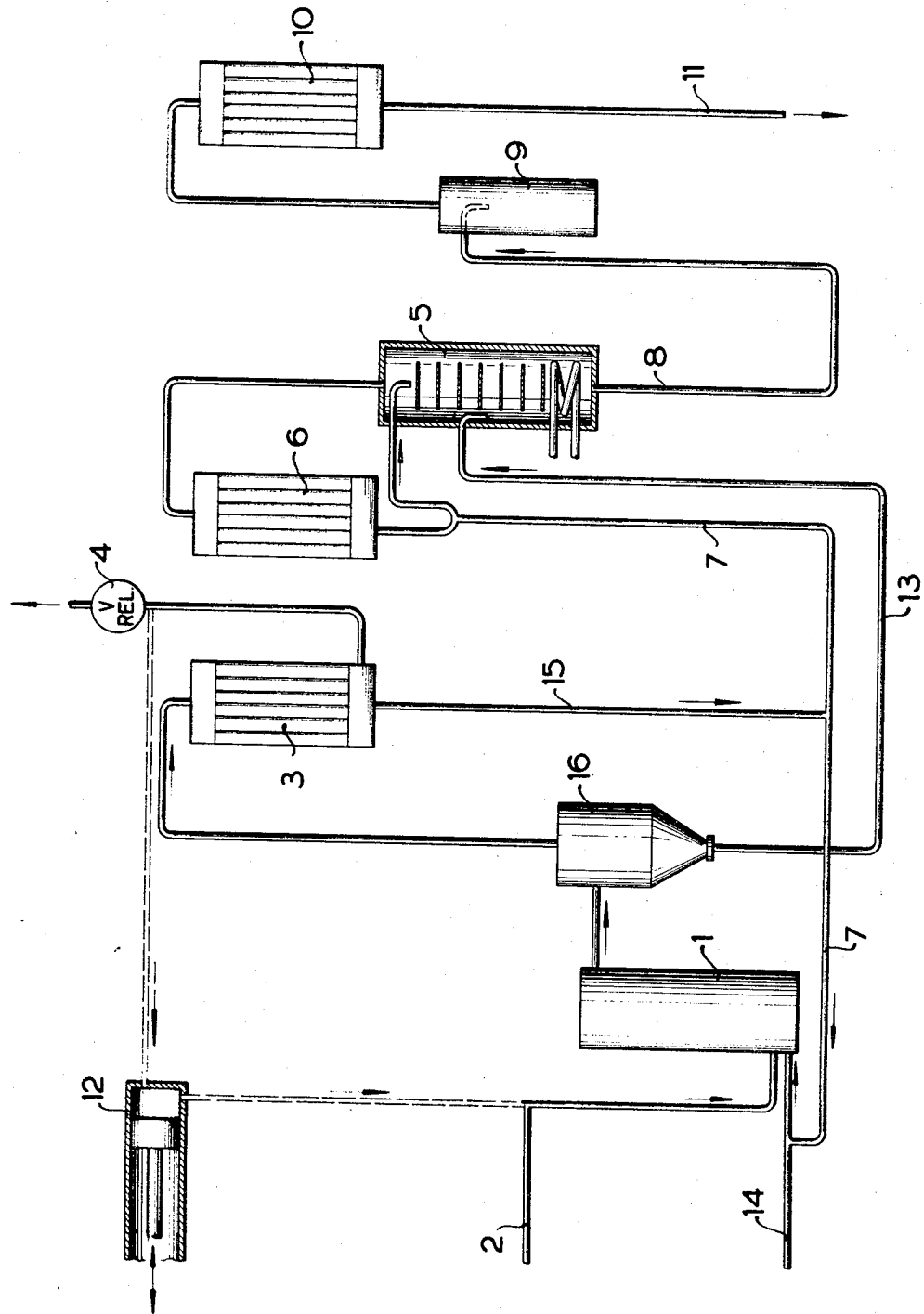

Wilhelm Vogt, Hurth-Efferen, Kurt Sennewald, Hurth-Hermulheim, and Hermann Glaser, Erftstadt Lechenich, Germany, assignors to Knapsack Aktiengesellschaft, Knapsack near Cologne, Germany
Filed Nov. 12, 1971, Ser. No. 198,128
Claims priority, application Germany, Nov. 14, 1970,
P 20 56 132.4
Int. Cl. C07c 67/00
U.S. Cl. 260—491      4 Claims

ABSTRACT OF THE DISCLOSURE

Production of glycerol triacetate and glycerol diacetate by the reaction of allyl acetate, acetic acid and molecular oxygen at elevated temperature, under a pressure of between 1 and 200 atmospheres absolute in liquid phase, in the absence of catalysts. More particularly, a solution of allyl acetate in acetic acid containing between 1.5 and 15 weight percent of acetaldehyde is reacted with a mixture of oxygen and inert gas, at a temperature of between 30 and 250° C.

---

The present invention relates to the production of glycerol triacetate and glycerol diacetate by the reaction of allyl acetate, acetic acid and molecular oxygen at elevated temperature and under pressures of between 1 and 200 atmospheres absolute, in liquid phase in the absence of catalysts.

German published specification P 19 60 142.4 describes a process for making glycerol triacetate and glycerol diacetate by the reaction of allyl acetate, acetic acid and molecular oxygen at elevated temperature in liquid phase, wherein a solution of allyl acetate in acetic acid is reacted with a mixture of oxygen and inert gas at a temperature of between 80 and 250° C., under a pressure of between 1 and 200 atmospheres absolute, in the absence of catalysts. This earlier process is preferably carried out at temperatures of between 125 and 180° C. Examples 16 and 17 described in this earlier specification show that the addition of substances yielding peroxy compounds, such as aldehydes, which are sometimes added to induce liquid phase oxidation, does not beneficially influence the reaction velocity and yield. Example 17 is noted to use a batch which inter alia contains 0.5 weight percent of aldehyde.

In sharp contrast with this existing preconception, we have now unexpectedly discovered that by the addition of relatively large proportions of acetaldehyde to the allyl acetate solution in acetic acid it is possible substantially to improve the yield of glycerol acetates, based on the allyl acetate used, and to operate at substantially lower temperatures, particularly at temperatures of between 70 and 120° C., and this without reduction of the reaction velocity down to a value unacceptable for commercial operation. This is especially true concerning the oxidation of a mixture containing between 20 and 40 weight percent of allyl acetate, between 1.5 and 15 weight percent of acetaldehyde and between 45 and 78.5 weight percent of acetic acid.

The present invention relates more particularly to a process for the manufacture of glycerol triacetate and glycerol diacetate by the reaction of allyl acetate, acetic acid and molecular oxygen at elevated temperature, under pressures of between 1 and 200 atmospheres absolute, in liquid phase in the absence of catalysts, which process comprises reacting a solution of allyl acetate in acetic acid containing between 1.5 and 15 weight percent of acetaldehyde, with a mixture of oxygen and inert gas, at a temperature of between 30 and 250° C.

Further preferred features of the process of the present invention comprise:

(a) Effecting the reaction at temperatures of between 40 and 150° C. under pressures of between 5 and 100 atmospheres absolute;

(b) Using an acetic acid solution containing between 0.1 and 1 mol of acetaldehyde per mol of allyl acetate;

(c) Continuously supplying a reaction zone with the solution of allyl acetate and acetaldehyde in acetic acid and with the mixture of oxygen and inert gas; conveying the resulting reaction mixture from the reaction zone to a sojourn zone and effecting separation therein into liquid and gaseous reaction products; subjecting reaction gas leaving the sojourn zone overhead to condensation so as to recover unreacted allyl acetate, acetaldehyde and acetic acid and recycling recovered liquid material to the reaction zone, and mixing the balance proportion of the reaction gas with fresh oxygen and recycling the resulting gas mixture to the reaction zone; continuously removing a crude glycerol acetate mixture from the bottom of the sojourn zone, delivering the said crude glycerol acetate mixture to a first distilling zone and expelling unreacted allyl acetate, acetaldehyde and acetic acid overhead under reduced pressure, condensing the expelled matter and recycling it to the reaction zone, delivering the glycerol acetates from the base of said first distilling zone to a second distilling zone and distilling off traces of high-boiling fractions therein;

(d) Allowing carbon oxides, which appear in the cycle gas, to increase therein up to a rate of 95 percent by volume.

The reaction should preferably be carried out under over-pressure in view of the fact that the mixture has a vapor pressure as high as several atmospheres (gauge pressure) in the mean temperature range of between 70 and 120° C., within which the reaction substantially occurs, and further in view of the fact that a satisfactory partial pressure value is required to be established for the oxygen in gas phase to have a fair solubility in liquid phase. The reaction of the present invention is carried out in the absence of catalysts. It is not promoted by the addition of iron, copper, nickel, molybdenum or manganese addends, for example; these have even been found partially to retard the reaction.

The reaction may be carried out intermittently in an autoclave made up of inert material (e.g. stainless steel, enameled steel, glass) receiving a solution of between about 20 and 40 weight percent of allyl acetate and between about 8 and 10 weight percent of acetaldehyde in acetic acid, which is heated to a temperature of between 70 and 120° C. and oxidized therein with thorough agitation, by the introduction under pressure of an inert gas mixture containing air or molecular oxygen. As a matter of precaution, the oxygen-containing gas is supplied at a rate not excelling the limit of explosion downstream of the reactor, particularly within higher pressure ranges. A particularly beneficial effect of the reaction resides in the fact that it can be carried out with the use of allyl acetate/acetic acid mixtures, such as those which are obtained by the reaction of propylene and acetic acid with oxygen in gas phase and in contact with catalysts having a noble metal of Group VIII of the Periodic System as an active component therein. The addition of acetaldehyde, which is converted to acetic acid during the reaction, could not be found to give rise to the formation of foreign substances. Needless to say therefore the work-up is essentially easier to carry out.

The process of the present invention, which is illustrated in the accompanying flow scheme, may also be carried out in continuous fashion, for example with the use of a reactor made up of inert material (e.g. titanium, stainless steel, enameled steel, glass).

As can be seen, the base of reactor 1, which is arranged in upright position, is supplied with the starting mixture consisting of allyl acetate, acetaldehyde and acetic acid and travelling through conduit 14, and supplied further with an oxygen-containing gas, e.g. air, flowing through conduit 2. In sojourn vessel 16, which is arranged downstream of the reactor and acts as a separator, liquid reaction mixture is separated from reaction gas. Acetic acid, acetaldehyde and allyl acetate contained in the reaction gas are conveyed to condenser 3, liquefied therein and recycled to reactor 1, through lines 15, 7 and 14. The issuing gas is relieved downstream of condenser 3 by passing it through overflow valve 4. Valve 4 is used to maintain the apparatus under the pressure necessary for the reaction to proceed at a satisfactory speed. The reaction mixture having glycerol acetate therein is removed from the bottom of sojourn vessel 16 through conduit 13, and conveyed to short distilling column 5, wherein allyl acetate, acetaldehyde and acetic acid are isolated as head products, under vacuum. The head products are condensed in condenser 6 and recycled to reactor 1 through conduits 7 and 14. Glycerol acetate is the sump product. It is conveyed through conduit 8 to flash-evaporator 9, freed from residues therein, liquefied in cooler 10 and removed through conduit 11.

The proportions of allyl acetate and acetic acid transformed into glycerol acetates and the acetaldehyde, which underwent reaction, are continuously replaced by fresh feed material, which is supplied to the system through conduit 14. The reaction product consists substantially of about 80% of glycerol triacetate and about 20% of glycerol diacetate. It is possible to operate reactor 1 and sojourn vessel 16, which may also be regarded as being a post-reactor, at different temperatures. For example, reactor 1 may be operated at 80° C. and sojourn vessel 16 at 120° C.

The single passage of air through the apparatus may be replaced by the steps comprising recycling to reactor 1, by means of compressor 12, a portion of gas issuing from condenser 3—the issue gas contains $CO_2$ and CO which originate from secondary cracking and oxidation reactions—and supplying the gas stream with concentrated oxygen at the rate necessary for oxidation. This latter procedure is preferred for its reliability as it enables the $O_2$-concentration to be maintained below the limit of explosion, in the overall system. By the removal of minor quantities of issue gas through overflow valve 4, it is also possible, and this in the absence of adverse effects upon the reaction, to allow the CO and $CO_2$ to concentrate up to 95 percent by volume in the recycle gas, based on the uncondensed fraction of issue gas. This means in other words that the desensitizing inert gas consists exclusively of $CO_2$ and CO in the ratio of about 1:1 to 3:1, which is established in the course of the reaction.

Glycerol acetates are products which are useful in the manufacture of cosmetic preparations, or glycerol, and useful high-boiling solvents or raw materials for making lacquers and varnishes.

EXAMPLE

Reactor 1 having a capacity of 5 liters, lined with titanium and arranged in upright position was supplied at a temperature of 104° C. with 1600 grams/hr. of a mixture consisting of 30 weight percent of allyl acetate, 8 weight percent of acetaldehyde and 62 weight percent of acetic acid, and with about 800 normal liters (S.T.P.) of air under a pressure of 50 atmospheres (gauge), through conduit 14. In sojourn vessel 16 (separator) downstream of the reactor there were obtained 1679 grams/hr. of a liquid reaction mixture. The reaction mixture was subjected to gas chromatographic analysis and found to contain acetic acid together with 1.7 weight percent of $CH_3CHO$, 22.2 weight percent of allyl acetate and 8.54 weight percent of glycerol acetates. The glycerol acetates were composed of about 80 percent of glycerol triacetate and 20 percent of glycerol diacetate. This corresponded to a yield of 64.4 percent of glycerol acetates, based on the allyl acetate which underwent reaction. 12.6 percent of the allyl acetate which underwent reaction was found to have been oxidized to CO, $CO_2$ and formic acid. Assuming that all of the acetaldehyde consumed underwent quantitative oxidation to acetic acid, the acetic acid balance indicated that the 23% balance proportion of reacted allyl acetate underwent oxidation to acetic acid. Following distillation of the liquid reaction mixture, a practically residue-free glycerol acetate was obtained, which was hydrolyzed by conventional methods to yield pure glycerol.

We claim:

1. A process for the manufacture of glycerol triacetate and glycerol diacetate by the reaction of allyl acetate, acetic acid and molecular oxygen at elevated temperature, under a pressure of between 1 and 200 atmospheres absolute in liquid phase, in the absence of catalysts, which comprises reacting a solution of allyl acetate in acetic acid containing between 1.5 and 15 weight percent of acetaldehyde, with a mixture of oxygen and inert gas, at a temperature of between 30 and 250° C.; continuously supplying a reaction zone with the solution of allyl acetate and acetaldehyde in acetic acid and with the mixture of oxygen and inert gas; conveying the resulting reaction mixture from the reaction zone to a sojourn zone and effecting separation therein into liquid and reaction products; subjecting reaction gas leaving the sojourn zone overhead to condensation so as to recover unreacted allyl acetate, acetaldehyde and acetic acid and recycling recovered liquid material to the reaction zone, and mixing the balance proportion of the reaction gas with fresh oxygen and recycling the resulting gas mixture to the reaction zone; continuously removing a crude glycerol acetate mixture from the bottom of the sojourn zone, delivering the said crude glycerol acetate mixture to a first distilling zone and expelling unreacted allyl acetate, acetaldehyde and acetic acid overhead, under reduced pressure, condensing the expelled matter and recycling it to the reaction zone, delivering the glycerol acetates from the base of said first distilling zone to a second distilling zone and distilling off traces of high-boiling fractions therein.

2. The process as claimed in claim 1, wherein the reaction is carried out at a temperature of between 40 and 150° C. and under a pressure of between 5 and 100 atmospheres absolute.

3. The process as claimed in claim 1, wherein the acetic acid solution contains between 0.1 and 1 mol of acetaldehyde per mol of allyl acetate.

4. The process as claimed in claim 1, wherein carbon oxides present in the cycle gas are allowed to increase therein up to a concentration of 95 percent by volume.

References Cited

UNITED STATES PATENTS 3,674,839   7/1972   Vogt et al. _____ 260—491

VIVIAN GARNER, Primary Examiner

U.S. Cl. X.R.

260—530 R, 542, 635 R